United States Patent

Raley et al.

[11] Patent Number: 4,604,156
[45] Date of Patent: Aug. 5, 1986

[54] METHOD OF FABRICATING A CYLINDRICAL MULTILAYER SCREEN

[75] Inventors: Garland E. Raley; Dean M. Spear, both of Terre Haute, Ind.

[73] Assignee: Ethyl Corporation, Richmond, Va.

[21] Appl. No.: 690,330

[22] Filed: Jan. 10, 1985

Related U.S. Application Data

[62] Division of Ser. No. 534,359, Sep. 21, 1983, Pat. No. 4,543,299.

[51] Int. Cl.[4] .............................................. B32B 31/12
[52] U.S. Cl. ................................... 156/294; 29/163.5 R; 228/132; 264/154; 264/504; 425/290; 425/388; 425/DIG. 37; 428/596
[58] Field of Search .......... 29/121.3, 163.5 F, 163.5 R; 156/293, 294; 181/227, 247, 248; 228/126, 131, 132; 264/154, 504; 425/290, 388, DIG. 37; 428/596

[56] References Cited

U.S. PATENT DOCUMENTS

| | | | |
|---|---|---|---|
| 319,615 | 6/1885 | Plume | 29/121.3 X |
| 3,049,796 | 8/1962 | Pall | 29/163.5 F X |
| 3,054,148 | 9/1962 | Zimmerli | 264/154 X |
| 3,709,647 | 1/1973 | Barnhart | 425/224 |
| 4,151,240 | 4/1979 | Lucas et al. | 264/154 X |
| 4,155,693 | 5/1979 | Raley | 264/504 X |
| 4,252,516 | 2/1981 | Raley et al. | 425/388 X |
| 4,319,868 | 3/1982 | Riemersma et al. | 425/290 |
| 4,388,056 | 6/1983 | Lee et al. | 425/83.1 |
| 4,441,952 | 4/1984 | Mullane | 156/252 X |

Primary Examiner—Robert A. Dawson
Attorney, Agent, or Firm—Donald L. Johnson; John F. Sieberth; Paul H. Leonard

[57] ABSTRACT

A laminated, cylindrical, metal screen or molding element for vacuum perforation of plastic film or sheets, comprising two or more relatively thin cylindrical metal screens, each having a predetermined inside and outside diameter and each having a plurality of openings or holes therein of a predetermined size and geometrical shape, and said relatively thin screens stacked and bonded together, diametrically one inside the other thereby providing a screen of a desired thickness and a desired hole geometry wherein the holes in the screen have substantially straight walls perpendicular to the surface of the screen. A method of producing a relatively thick cylindrical metal screen for vacuum perforation of plastic film or sheets wherein the holes or openings in the screen have substantially straight walls perpendicular to the surface of the screen, comprising stacking and bonding together two or more matched relatively thin metal screens diametrically one inside the other.

10 Claims, 10 Drawing Figures

METHOD OF FABRICATING A CYLINDRICAL MULTILAYER SCREEN

This application is a division of application Ser. No. 534,359, filed Sept. 21, 1983, now U.S. Pat. No. 4,543,299.

BACKGROUND OF THE INVENTION

The present invention is in the general field of perforated plastic film and especially relates to vacuum perforating of plastic film. The invention particularly relates to metal screens or molding elements used in the vacuum perforation of plastic film and to a method of fabricating such screens.

Perforated plastic film has many useful applications. It is used in gardening and farming to prevent the growth of grass and weeds while permitting moisture to be transmitted through the film to the soil beneath. Perforated film is also used for making disposable diapers, for example, see U.S. Pat. No. 3,814,101.

One of the earlier methods for vacuum perforation of plastic film is disclosed in U.S. Pat. No. 3,054,148. The patentee describes a stationary drum having a molding element or screen mounted around the outer surface of the drum and adapted to freely rotate thereon. A vacuum chamber is employed beneath the screen to create a pressure differential between the respective surfaces of the thermoplastic sheet to be perforated to cause the plasticized sheet to flow into openings provided in the screen and thereby cause a series of openings, holes or perforations to be formed in the plastic sheet or film.

A variety of methods and apparatuses including particular types of perforating screens or rotatable molding elements have been developed over the years for particular perforation operations. Examples of these are U.S. Pat. Nos. 4,155,693, 4,252,516, 3,709,647, 4,151,240, 4,319,868 and U.S. Pat. No. 4,388,056. In U.S. Pat. No. 4,155,693, the screen is comprised of a series of perforated metal strips preferably welded together to form a cylinder. U.S. Pat. No. 4,252,516 provides a screen having a series of hexagonal depressions with elliptical holes centered therein. U.S. Pat. No. 3,709,647 provides for a rotating vacuum-forming roll having a circulating cooling medium therein.

U.S. Pat. No. 4,151,240 provides a means for cooling the film after it has been perforated and debossed. U.S. Pat. No. 4,319,868 sets forth an apparatus for making a thermoplastic film having raised bosses with perforated tips. A particularly constructed embossing roll for effecting the desired film pattern is disclosed. U.S. Pat. No. 4,388,056 discloses an apparatus for continuously forming an air-laid fibrous web having oppositely phased, cylindrically undulating side edges and a predetermined basis weight distribution. An air-laying drum has a honeycomb type annular-shape frame including circumferentially extending ribs and transverse plates. A stationary adjustable air flow modulating means is disposed adjacent the radially inwardly disposed boundary of an arcuate portion of a circumferentially segmented annular-shape plenum, circumferentially spanning a plurality of plenum segments for adjusting a pressure drop across particular areas of the surface of the air-laying drum.

Vacuum perforation of thin plastic films involves the extrusion of molten polymeric materials such as polyethylene and other plastic polymers though a slot die. The hot melt web of film or plastic sheet exiting the die impinges on a rotating cylindrical screen which is mounted on a stationary vacuum drum or roll. The vacuum roll has an axial slot and a set of seals extending longitudinally the length of its outside surface, beneath the area where the web of plastic impinges on the screen or molding element. A high vacuum from inside the screen is directed through the slot in the vacuum roll. The vacuum present within the slot forms or molds the plastic film or sheet to the screen and perforates it through the holes of the screen. At the same time, an airflow is produced which cools the film.

The most important component of the vacuum processing equipment is the cylindrical screen. This molding element defines aesthetic and mechanical properties of the film as well as the geometric pattern of the perforated film. In a preferred screen fabrication technique, the desired screen pattern is nickel plated on a specially prepared cylindrical mandrel. A seamless cylindrical nickel screen of any predetermined or desired pattern can be produced. Other metals, such as copper may also be used.

Some film products require the use of relatively thick screens, i.e., from 0.020 to 0.100 inches thick, and also require that the walls of the patterned holes are straight and perpendicular to the screen surface. Present screen fabrication techniques as heretofore described are not capable of producing a screen meeting these requirements. The patterned holes on screens produced by nickel plating a prepared cylindrical mandrel, even with the application of specialized plating and post etching techniques, take the shape of inverted, truncated, concaved cones. The thicker the screen, the more exaggerated the effect becomes.

It is therefore a principal object of the present invention to provide a method of fabricating relatively thick, seamless, cylindrical metal screens having patterned holes whose walls are substantially straight and perpendicular to the surface of the screen.

Another principal object of the invention is to provide a thick, seamless, cylindrical metal screen which has patterned holes whose walls are substantially straight and perpendicular to the screen surface.

Other objects and advantages of the instant invention will become more readily apparent from the drawings and a reading of the description hereinafter.

SUMMARY OF THE INVENTION

A relatively thick, laminated, cylindrical metal screen or molding element for vacuum perforation of plastic film or sheets is provided which comprises two or more relatively thin, cyclindrical metal screens, each of which has predetermined inside and outside diameters and a plurality of openings or holes therein of predetermined size and geometrical shape, which screens have been stacked and bonded together diametrically one inside the other, and having a desired thickness and a desired hole geometry wherein the holes have substantially straight walls which are perpendicular to the surface of the screen.

A method is also provided for producing the screens wherein matched sets of relatively thin, seamless, cylindrical metal screens are overplated with a thin layer of a bonding metal within specified tolerances wherein the inside diameter of the largest screen fits the outside diameter of the next largest screen. Each screen fits similarly inside the next largest screen and has a common reference mark on each end thereof for alignment. Two relatively thicker seamless metal sleeves of different diameters are prepared wherein the inside surface of the larger diameter sleeve is chrome plated and the outside surface of the smaller diameter sleeve is chrome plated. The inside diameter of the larger sleeve fits the outside diameter of the largest diameter matched screen within specified tolerances. The outside diameter of the smaller sleeve fits the inside diameter of the smallest diameter matched screen within specified tolerances. The entire inside surfaces and the matched screens are coated with an appropriate flux. The largest cyclindrical sleeve is cradled and clamped so as to retain its cylindrical shape. The largest diameter screen is malformed, slid inside the cradled sleeve and then reformed into its cylindrical shape. The next largest screen is then malformed and slid inside the reformed screen. The reference marks of the two screens are aligned and the screens are then pinned or otherwise fastened together. The smaller screen is then reformed into its cylindrical shape. The remaining screens of the matched set are similarly assembled. The smaller diameter sleeve is installed similarly to the matched screens. The final assembly of sleeves and screens is then heated in an oven to a suitable bonding temperature, cooled to near ambient temperature and then removed from the oven. Thereafter, the outside sleeve is carefully cut axially and removed. Any remaining flux is removed with an appropriate agent and the inside sleeve is removed thereby leaving a finished laminated screen product of desired specifications.

BRIEF DESCRIPTION OF THE DRAWINGS

Referring now to FIG. 1 of the drawings, vacuum process equipment and method for perforating plastic film or sheet therewith are schematically illustrated. A plastic polymer such as polyethylene is heated to a melt and extruded from an extruder E through a die D where a film web 10 is formed. The web 10 is directed onto a rotating cylindrical screen 11 having a desired pattern of holes which is turning clockwise as indicated by arrow A around a stationary vacuum roll or drum 12. A vacuum chamber 13 within the roll 12, longitudinal air slot 14 and seals 15 are employed to create a pressure differential between the respective surfaces of the thermoplastic sheet or web 10 to cause the plasticized sheet to flow into the holes in the screen in the direction indicated by the arrow B and therefore perforate the web 10. The perforated film web 10' travels onto a guide roll 16 and continues onto a wind-up roll 17. Additional guide rolls or tensioning rolls can be employed as desired as well as various film treating equipment.

DESCRIPTION OF THE PREFERRED EMBODIMENTS

Figure 1:
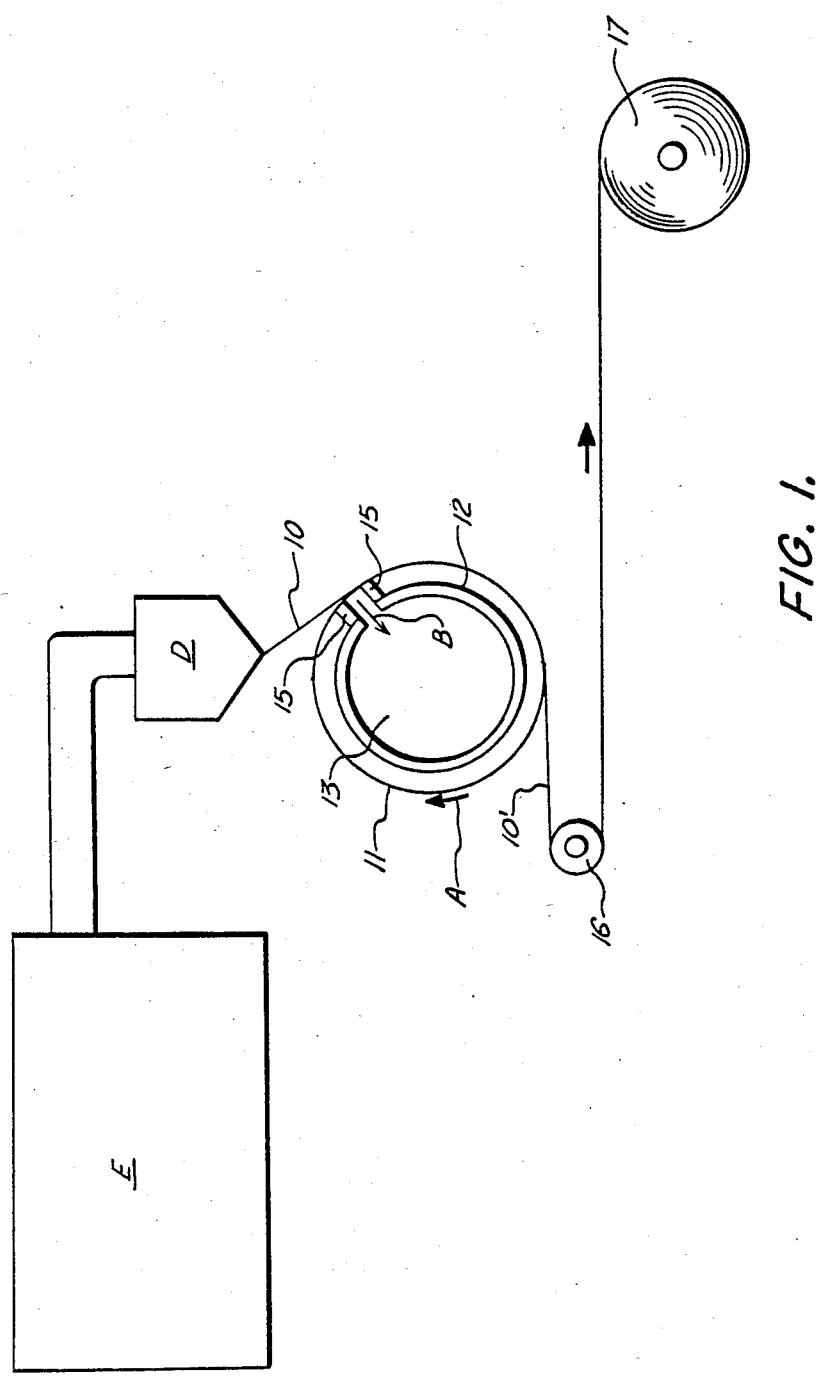
FIG. 1 is a schematic view illustration an apparatus and method for vacuum perforation of thermoplastic film.

Seamless cylindrical nickel screens produced by plating are made by two principal methods. In one method, a mandrel is ground to a dimension corresponding to the desired dimension of the finished screen. The desired screen hole pattern is engraved on the mandrel either by spiral engraving or malett indexing techniques. A plating resist medium is applied to the surface of the mandrel, filling the pattern produced by the engraving. A finish grinding operation is employed to remove the plating resist medium from the land areas between the engraved pattern, so that only the land area will be subject to plating. Subsequent nickel plating of the mandrel forms the screen. The mandrel is cooled and the finished screen is removed therefrom.

The other method of producing a seamless cylindrical nickel screen is similar to the foregoing method, except that instead of engraving the pattern on the mandrel, a special photographic negative of the pattern is created and wrapped around the mandrel. Exposing of the negative transfers the pattern to the mandrel in the form of a plating resist, leaving only the land areas of the screen available for plating. The mandrel is then plated, forming the screen which is then removed from the mandrel to obtain the finished product.

Either of these screen manufacturing methods are satisfactory to produce thin screens for lamination; however, the latter method is preferred. Using a photographic negative permits relative ease in transferring a pattern from one diameter screen to an identical one on another diameter screen by reduction of the photographic negative.

In preparing a matched set of screens for lamination, several requirements must be met. First, each successive screen of the set must fit diametrically inside the next larger diameter screen, with sufficient space allowed for the metal or tin-lead alloy plating of each screen. Secondly, each screen of the set must be geometrically identical. This means that each screen has the same number of holes, both axially and circumferentially, and that the radial centerlines of each hole of any one screen match identically the radial centerlines of the corresponding holes in all other screens in the set. Finally, the individual hole geometry of all the aligned holes in all the screens must be nearly identical.

The inside diameter of each individual thin screen to be laminated may be calculated by the following formula:

$$D_n = D + 2t_p + (n-1)(2t_L + 4t_p)$$

wherein $D_n$ = Inside diameter of each individual thin screen n;
$D$ = Inside diameter of the finished laminated screen;
$n$ = The number of individual thin screens, counting from inside out, n=1, 2, 3, ... N;
$t_L$ = The individual thin screen thickness (assumed constant for each screen of the set); and, $t_p$ = The thickness of the metal plating to be applied (assumed constant for each screen of the set).

The inside diameter of the outer solid metal sleeve may be calculated by the following formula:

$$Do.s = D_N + 2t_L + 2tp + 2tc$$

wherein

Do.s = Inside diameter of the outer sleeve;
$D_N$ = Inside diameter of the Nth thin screen; and,
tc = The thickness of the chrome plating to be applied.

The inside diameter of the inner solid metal sleeve may be calculated by the following formual:

$$DI.s = D - 2ts - 2tc$$

wherein ts = The thickness of the solid metal sleeves (assumed to be same for each sleeve).

Using the foregoing procedures and formulas, matched sets of seamless, cylindrical metal (nickel) screens may be produced as follows:

1. Grind a mandrel to a dimension corresponding to the finished sleeve inside diameter of Do.s, produce the outer cylindrical metal sleeve thereon, and plate the sleeve to a thickness of ts.

2. Grind the same mandrel to a dimension corresponding to the finished inside diameter of the Nth screen. Apply a desired screen pattern using the photonegative resist method including a reference alignment mark at each end of the screen. Plate the mandrel to a thickness of $t_L$, forming the largest, "Nth", screen of the matched set.

3. Grind the same mandrel to a dimension corresponding to the finished inside diameter of the (N−1)th screen. Reduce the photographic negative in the circumferential direction only to equal the circumference of the reground mandrel, and apply the pattern to the mandrel as before. Plate the mandrel to a thickness of $t_L$ forming the next largest, (N−1)th, screen of the matched set. The photographic negative reduction and transfer operation may be a computerized operation.

4. Repeat Step 3 for each of the remaining screens of the matched set.

5. Grind the same mandrel to a dimension corresponding to the finished sleeve inside diameter of DI.s., produce the inner cylindrical sleeve thereon, and plate the sleeve to a thickness of ts.

Since screens are generally prepared for particular film perforating operations, the use of the same mandrel is preferable. Should a number of laminated screens of the same pattern be produced, a number of mandrels may be used, as appropriate.

In the preferred form of the invention, a matched set of thin, seamless, cylindrical, nickel screens are prepared as set forth in detail hereinafter. The length and diameter of the screens are selected on the basis of the type of vacuum perforating equipment and the number of screens to be laminated. The thickness of each screen is determined on the basis of the type of hole wall shape desired. A screen thickness of approximately 0.005 inches provides hole walls that are substantially straight and perpedicular to the surface of the screen.

Each screen of the matched set is overplated with a thin layer of a bonding material, preferably a tin-lead alloy. An alloy of 63 weight percent tin and 37 percent lead is especially preferred. An alloy layer of about 0.00025 inches thick is most preferred. Each screen of the matched set is designed and produced so that after plating, the inside diameter of the largest screen fits, within a specified tolerance, the outside diameter of the next largest screen. In turn, each screen of the set fits similarly inside the next largest screen. Each screen of the set is designed and produced with a common reference or aligning mark at each end thereof. Alignment of the reference marks during assembly produces proper pattern hole alignment.

Two seamless cylindrical nickel sleeves of different diameters are also required. The sleeves are about the same length of the thin screens. The thickness of the sleeves may be varied, but a thickness of approximately 0.010 inches is especially preferred. The inside surface of the larger diameter sleeve, and the outside surface of the smaller diameter sleeve are chrome plated. A plating thickness of about 0.0005 inches is most preferred. The sleeves are designed and produced so that after chrome plating, the inside diameter of the larger sleeve fits, within a specified tolerance, the outside diameter of the largest diameter thin screen, after the screen has been plated. Also, after chrome plating, the outside diameter of the smaller sleeve is designed and produced to fit the inside diameter of the smallest diameter thin screen of the matched set of screens, after the screen has been plated. The two sleeves are used as fixtures during the assembly and bonding operations as explained hereinafter.

The tin-lead alloy plating applied to each screen provides the bonding medium for lamination. The chrome plating applied to the sleeves acts as a resist to prevent the tin screens being laminated from bonding to the sleeves.

After the matched set of thin screens and the two sleeves have been prepared in the manner described, the assembly and bonding operations can be completed.

Figure 2:
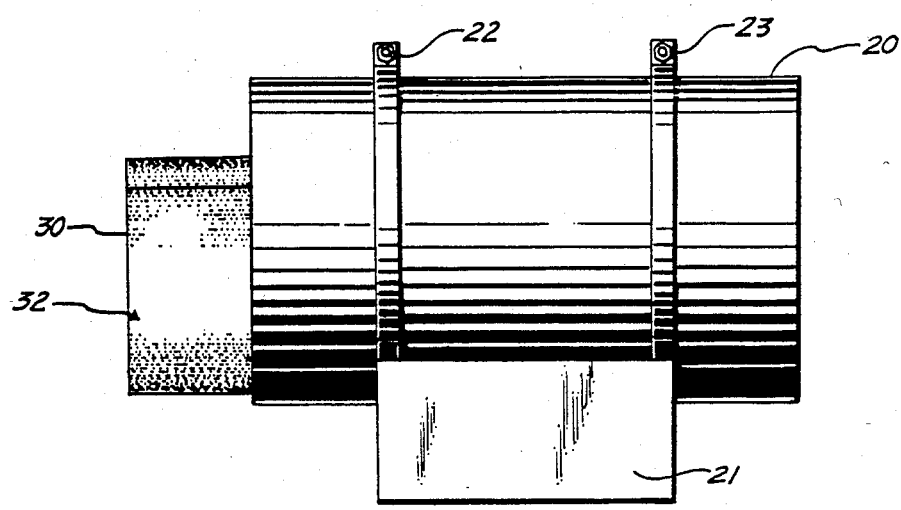
FIG. 2 is a side elevational view of a sleeve mounted in a cradle with a screen partially inserted therein.
Figure 3:
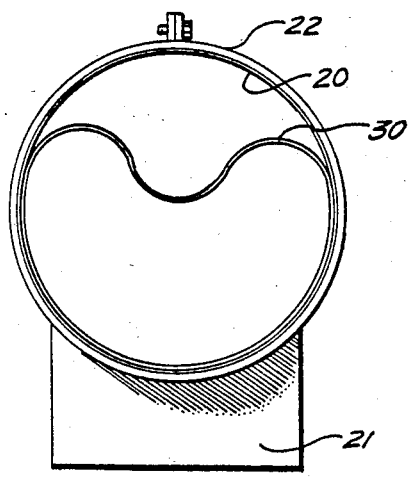
FIG. 3 is an end view of the assembly of FIG. 2 with the wall thickness of the screen and sleeve enlarged to show detail.
Figure 4:
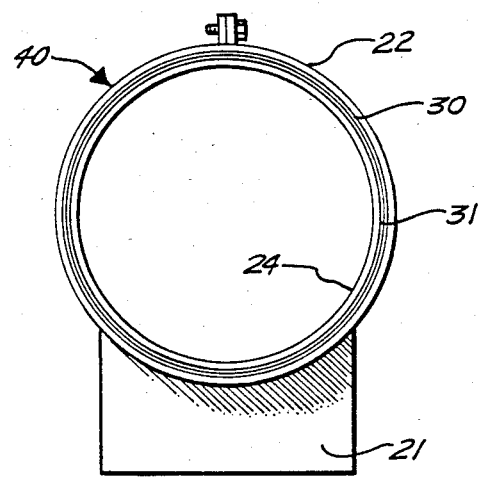
FIG. 4 is an end view similar to that of FIG. 3, but illustrates a complete assembly of screens and sleeves.

Referring now to FIGS. 2–4 of the drawings, the larger cylindrical sleeve 20 is mounted in a cradle 21 and restrained therein so as to retain its cylindrical shape by two stiff outside diameter ring clamps 22 and 23. Any other suitable restraining or clamping means may be used. The largest diameter thin screen 30 of the matched set of screens is malformed or otherwise distorted and slid or positioned inside the larger diameter sleeve 20. The screen 30 is then reformed into its cylindrical shape.

The next largest screen 31 is similarly malformed and slid inside the largest screen 30 of the assembly 40. Reference marks 32 on the ends of the two screens are aligned and the screens are pinned or otherwise fastened together.

If more than two thin screens are to be laminated or assembled, the remaining thin screens are similarly installed with the next largest thin screen being positioned inside the second thin screen 31 and so on, until each thin screen of the matched set of thin screens has been assembled.

Once all the thin screens have been assembled, the smaller sleeve 24 is positioned within the smallest diameter thin screen in the same manner as the various thin screens were installed. Prior to the installation of the smaller sleeve, the entire inside surface of the assembly is thoroughly coated with an appropriate flux, for example, a liquid solder flux having a pure resin base or a soldering paste containing zinc chloride, both manufactured by CG Electronics. Any other suitable flux may be used.

Once the assembly 40 is completed, it is transferred to an oven and uniformly heated to a temperature of about 400° F. ± 10° F. or 390° F. to 410° F. During the bonding cycle, the cylindrical nickel sleeves remain on the assembled screens. The sleeves act to uniformly restrain the screen laminates while permitting growth and shrinkage during heating and cooling cycles as they are preferably of the same material as the thin screens. The assembly is then allowed to cool in the oven to nearly room or ambient temperature. It is then removed from the oven for final operations.

After the assembly has been cooled and removed from the oven, the outside sleeve is carefully axially cut and removed. Remaining flux residue is removed from the screen assembly with a suitable agent, for example, by washing with a degreasing liquid followed by a neutralizing wash of a 2 percent solution of muriatic acid. Any other suitable flux removing agent may be used. The inside sleeve is then removed, leaving a finished laminated screen of a desired thickness.

Although other bonding mediums may be used, the specific one of 63% tin-37% lead, plated to a thickness of 0.00025 inches particularly meets the requirements of the fabricating system. Pure, plated nickel initiates embrittlement at approximately 425° F. Any bonding system selected must therefore cure or flow at a temperature below the embrittlement temperature of the nickel plating. The tin-lead alloy preferred is the eutectic formulation of the two elements. The alloy melts and solidifies at 361° F. The instant bonding system is unique, in that, by plating each individual thin screen prior to assembly, difficult and messy applications of bonding mediums during assembly are avoided. The tin-lead alloy plating thickness of 0.00025 inches is the optimum thickness to produce good bonding with minimum excess alloy.

Figure 5:
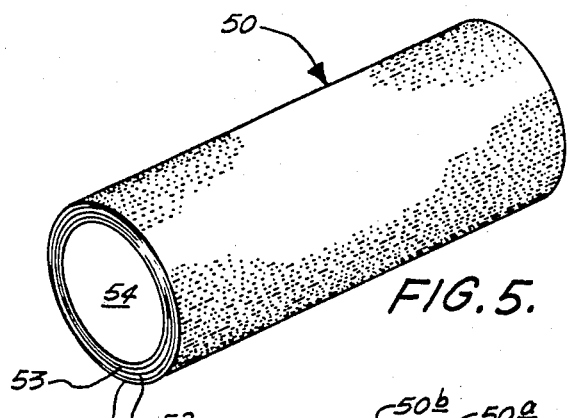
FIG. 5 is a perspective view of a laminated screen of the invention.

Referring now to FIG. 5, a laminated screen 50 of the invention is seen which comprises four thin screens 51, 52, 53 and 54 which have been stacked and bonded together in accordance with the foregoing procedure.

Figure 6:
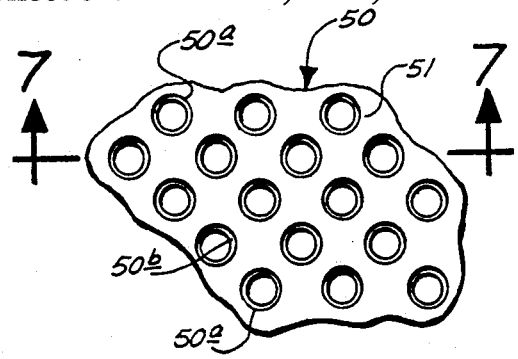
FIG. 6 is an enlarged view of a segment of the screen of FIG. 5.
Figure 7:
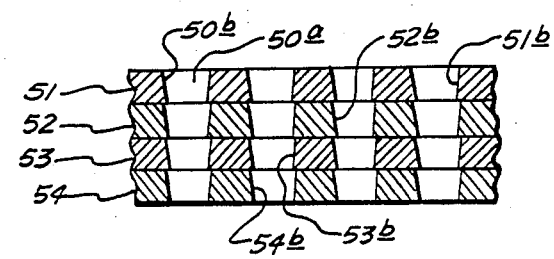
FIG. 7 is a sectional view of the screen segment of FIG. 6 taken along line 7—7.

As seen in FIG. 6, the screen 50 has a plurality of openings or holes 50a therein. The holes 50a have walls 50b which are substantially straight as best seen in FIG. 7. In the latter figure, it is readily seen that the walls 50b are formed from the individual walls 51b, 52b, 53b and 54b of each of the tin screens 51, 52, 53 and 54, respectively. For purposes of illustration, the truncated holes of the thin screens have been exaggerated. The effect of the multiscreen lamination provides hole walls which are substantially straight.

While the invention is particularly directed to a method of producing relatively thick seamless cylindrical metal screens, especially nickel screens, with holes or openings which are essentially straight and perpendicular to the screen surface, the method can also be utilized to provide thick screens with an expanded variety of hole radial cross-sections. It is only essential that the basic hole radial centerlines of each screen laminate be the same.

Although for simplification, the invention is illustrated with screens having round holes, other hole configurations or patterns are suitable. Such holes may be oval, rectangular, pentagonal, hexagonal or any other desired geometric shape.

Figure 8:
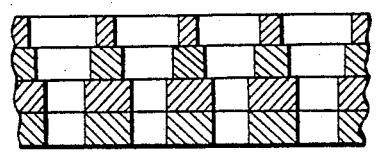
FIG. 8 is a sectional view of a screen segment similar to that of FIG. 7 illustrating an alternate hole radial cross-section.
Figure 9:
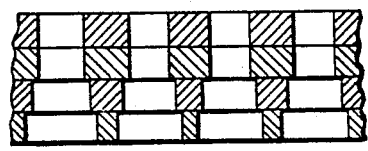
FIG. 9 is a sectional view of a screen segment similar to that of FIG. 7 illustrating another alternate hole radial cross-section.
Figure 10:
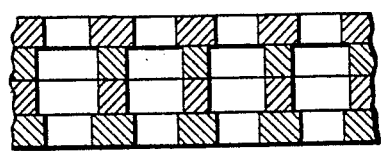
FIG. 10 is a sectional view of a screen segment similar to that of FIG. 7 illustrating still another alternate hole radial cross-section.

FIGS. 8–10 illustrate some of the screen arrangements that can be achieved by using thin screens of different hole sizes. It can readily be appreciated that a wide variety of hole shapes and sizes can be obtained for providing a particular hole effect in a thermoplastic film or sheet.

Although the invention is particularly suited for perforating thermoplastic sheets or film made from polyolefins, especially polyethylene and polypropylene, it can be used with other types of thermoplastic films as desired.

The foregoing disclosure and description of the invention is illustrative and explanatory thereof and various changes in the illustrated process may be made within the scope of the appended claims without departing from the spirit of the invention.

What is claimed is:

1. A method of making a relatively thick cylindrical metal screen for vacuum perforation of plastic film wherein the holes in the screen have substantially straight walls perpendicular to the surface of the screen, comprising stacking and bonding together two or more matched relatively thin cylindrical metal screens diametrically one inside the other, each of said relatively thin metal screens having a plurality of holes therein which have substantially straight walls and which are perpendicular to the surface of their respective relatively thin cylindrical metal screen.

2. The method of claim 1, wherein the matched metal screens are nickel metal screens.

3. The method of claim 1, wherein the matched metal screens are overplated with a bonding metal alloy.

4. The method of claim 3, wherein the metal alloy is tin-lead.

5. The method of claim 4, wherein the tin-lead alloy is about 63 weight percent tin and about 37 weight percent lead.

6. The method of claim 3, wherein the bonding is accomplished by coating the entire inner surface of the matched screen with a flux and heating the stacked screens in an oven to a temperature sufficient to effect the bonding.

7. The method of claim 1, wherein each of the matched relatively thin screens have the same geometrical hole pattern and the same number of holes both axially and circumferentially, with the radial centerlines of each hole of one thin screen matching the radial centerlines of each hole of the other thin screen.

8. The method of claim 7, wherein the geometrical hole pattern of each screen is round, oval, rectangular, pentagonal, hexagonal or other geometric shape.

9. A method of making a relatively thick laminated, cylindrical metal screen or molding element for vacuum perforation of plastic film or sheets, wherein the holes in said relatively thick screen have substantially straight walls, comprising stacking and bonding together two or more relatively thin cylindrical metal screens, each of said relatively thin screens having a plurality of openings or holes therein, said relatively thin screens being stacked and bonded together diametrically one inside the other to provide said relatively thick laminated cylindrical metal screen, the holes of each of said thin screens being substantially aligned with the holes of the other of said thin screens and the holes of said relatively thick laminated cylindrical metal screen having substantially straight walls perpendicular to the surface of said relatively thick laminated cylindrical metal screen.

10. A method of making a relatively thick laminated, cylindrical metal screen or molding element for vacuum perforation of plastic film or sheets, comprising stacking and bonding together two or more relatively thin cylindrical metal screens, each of said relatively thin screens having a plurality of openings or holes therein, said relatively thin screens being stacked and bonded together diametrically one inside the other to provide said relatively thick laminated cylindrical metal screen, the holes of each of said thin screens being substantially aligned with the holes of the other of said thin screens, each of the holes in one of said thin screens having a radial centerline matching a radial centerline in each of said holes of said other relatively thin screens, and the holes of at least one of said thin screens having a greater radius than the radius of the holes of at least one of said other thin screens.

* * * * *